Patented Apr. 17, 1945                                                           2,373,706

UNITED STATES PATENT OFFICE 2,373,706

TERPENE RESINS

Emil Ott, Wilmington, Del., assignor to Hercules Powder Company, Wilmington, Del., a corporation of Delaware No Drawing. Application October 2, 1941, Serial No. 413,301

17 Claims. (Cl. 260—80)

This invention relates to new resinous compositions of matter and to processes for their production. More particularly, it relates to resins prepared by the copolymerization of a terpene with isobutene.

It has been found, in accordance with this invention, that isobutene may be copolymerized advantageously with various terpenes or mixtures thereof to yield resinous materials having distinguishing and useful characteristics not possessed by terpene polymers or by isobutene polymers alone. Products having varied characteristics result depending upon whether the mixture submitted to polymerizing conditions consists predominantly of terpenes or is predominantly isobutene. Thus, by varying the percentage composition of the mixture submitted to polymerizing conditions, a series of new copolymer resins results which vary from low melting point thermoplastic resins characterized by their ability to yield highly viscous solutions to rubbery solids which show some tendency towards thermoplasticity and which are characterized by their being vulcanizable.

The copolymerization of the two materials is carried out by contacting a suitable admixture with a polymerization or condensation catalyst, desirably in the presence of an inert solvent. As catalysts, there may be employed metal halides, acids, or activated clays. After the reaction has been allowed to proceed to the point where there has resulted a substantial yield of copolymerized product, the reaction mixture is treated to remove the catalyst. Thereafter, unreacted constituents and any inert solvent present is removed.

There follow several specific examples which illustrate particular embodiments of the principles of this invention which, however, are in no way to be taken as being limiting. All parts and percentages are by weight unless otherwise indicated.

*Examples 1 to 11 incl.*

In carrying out these examples the following procedure was employed. Isobutene was condensed in a glass vessel at —70° C. to —50° C. Different amounts of β-pinene or dipentene together with ethyl chloride as reaction solvent were then added in a series of 11 separate preparations. The reaction mixtures were agitated while maintaining the temperature within the aforesaid limits. In certain of the preparations gaseous boron trifluoride was used as catalyst. Where used, it was passed into the reaction mixture over a period of from 0.5 hour to 1 hour with agitation at —70° C. to —40° C. In some of the other examples aluminum chloride was included as the catalyst. When used, it was added over a period of 0.25 hour with agitation at —70° C. to —40° C. After addition of the catalyst, the mixtures were agitated at —70° C. to —50° C. for periods as indicated in the accompanying table and were then diluted with additional ethyl chloride with agitation. After the indicated reaction periods, the reaction mixtures were added to 300 parts of 95% ethyl alcohol with agitation. The copolymer resins which precipitated were thoroughly washed with additional 95% ethyl alcohol and then dried. The dipentene employed in the examples was a commercial grade and contained approximately 75% dipentene and 25% para-cymene. The para-cymene was unreactive under the conditions employed. Further details of the reaction conditions and a description of the resulting copolymer resins are given in the following tabulation:

| Example No. | Terpene | Isobutene | Ethyl chloride | Catalyst | Reaction time | Ethyl chloride for dilution | Drop melting point | Properties |
|---|---|---|---|---|---|---|---|---|
| | | Parts | Parts | Parts | Hours | | °C. | |
| 1 | β-pinene (10) | | 25 | BF₃ (4) | 0.75 | 10 | 110 | Hard, brittle polymer. |
| 2 | β-pinene (13.5) | 1.5 | 25 | BF₃ (1.5) | 0.25 | 20 | 100 | Hard, brittle copolymer, slightly flexible, slightly extensible and retractable. |
| 3 | β-pinene (10) | 5 | 15 | BF₃ (4) | 1.0 | 18 | 65 | Flexible, somewhat tacky, slightly extensible and retractable. |
| 4 | β-pinene (10) | 5 | 25 | AlCl₃ (1.4) | 0.25 | 20 | 70 | Do. |
| 5 | β-pinene (5) | 10 | 25 | AlCl₃ (1.5) | 0.25 | 20 | 70 | Flexible, tacky, extensible, retractable, thermoplastic. |
| 6 | β-pinene (5) | 10 | 15 | BF₃ (4) | 1.5 | 22 | 55 | Do. |
| 7 | β-pinene (1.5) | 13.5 | 25 | AlCl₃ (1.5) | 0.25 | 20 | 70 | Rubber-like product, tendency to be thermoplastic, harder than isobutene polymer. |
| 8 | | 10 | 25 | AlCl₃ (1.5) | 0.25 | 20 | | Rubber-like product. |
| 9 | Dipentene (10) | | 20 | AlCl₃ (1) | 0.50 | 20 | 110 | Hard, brittle polymer. |
| 10 | Dipentene (10) | 5 | 20 | AlCl₃ (1) | 0.50 | | | Soft, flexible, slightly extensible and retractable. |
| 11 | Dipentene (5) | 10 | 20 | AlCl₃ (1) | 0.50 | 20 | 75 | Flexible, tacky, extensible and retractable. |

*Example 12*

A solution containing 2 parts of aluminum chloride in 56 parts of ethylene chloride was prepared. Another solution was then made up consisting of 8 parts of isobutene, 6 parts of ethylene chloride and 4 parts of allo-ocimene. To the latter solution, maintained at −30° C., were added 6.3 parts of the aluminum chloride solution, and the reaction mixture was held at −10° C. to −20° C. for 7 hours. The reaction mixture was then diluted with 150 parts of acetone containing 1 part of water to hydrate the catalyst. The precipitate was redissolved in benzene and reprecipitated with acetone. The resulting copolymer was colorless and flexible as compared with solid polymerized allo-ocimene. It had a thiocyanate value of 130.

As terpenes useful in preparing the copolymers, any terpene hydrocarbon having the empirical formula $C_{10}H_{16}$, or a mixture thereof, may be used. These include acyclic terpenes, such as, myrcene, ocimene, allo-ocimene, cryptotaenene, etc.; monocyclic terpenes, such as, dipentene, α-terpinene, β-terpinene, gamma-terpinene, terpinolene, sylvestrene, α-phellandrene, β-phellandrene, origanene, the pyronenes, etc.; bicyclic terpenes, such as, α-thujene, β-thujene, sabinene, the carenes, α-pinene, β-pinene, camphene, bornylene, α-fenchene, β-fenchene, gamma-fenchene, etc.

In place of pure terpenes or their synthetic mixtures, naturally-occurring terpene mixtures may be employed, as for example, wood or gum turpentine. Other fractions containing crude mixtures of terpenes obtained as a result of the recovery of oleoresinous materials from pine wood may be employed, as for example, "Solvenol," a mixture containing the monocyclic terpene hydrocarbons, terpinene, terpinolene and dipentene. Other terpene mixtures obtained in the heat isomerization of α- and/or β-pinene may be employed. For example, pyrolyzed α-pinene which may contain as much as 40% allo-ocimene along with substantial amounts of α-pinene, dipentene, etc., or pyrolyzed β-pinene which contains appreciable amounts of myrcene, etc., are useful. Terpene mixtures obtained in the synthesis of ethers and alcohols from α- and β-pinene may also be used.

In the examples the use of certain catalysts is shown. Others may be utilized. Thus, as polymerization catalysts, there may be employed the metal halides, such as, boron trifluoride and its molecular complexes with ethers and acids, titanium chloride, ferric chloride, and the halides of metals whose hydroxides are amphoteric, as aluminum chloride, stannic chloride, zinc chloride, etc.; acids, such as, hydrofluoric acid, fluoroboric acid, polybasic mineral acids, as orthophosphoric acid, tetraphosphoric acid, sulfuric acid, etc., acyl sulfuric acids, as acetyl sulfuric acid, alkyl sulfuric acids, as ethyl sulfuric acid, para-toluene sulfonic acid, etc.; and activated clays, such as, fuller's earth, diatomaceous earth, alumina, bauxite, synthetic magnesium silicates, etc. For the acid catalysts, certain anhydrides, as phosphorus pentoxide, etc., may be equivalently employed. The activated clays will desirably be calcined at temperatures of, for example, from 100° C. to 500° C. prior to use.

In the process of preparation of the copolymers, the catalyst to reactant ratio will generally vary between about 0.001 and about 1.0. The operable temperature will vary between about −70° C. and about 200° C., and the operable reaction period will vary between about 1 and about 400 hours. Preferably, when a metal halide catalyst is employed, the catalyst to reactant ratio will vary between about 0.02 and about 0.25, the reaction temperature between about −70° C. and about −30° C., and the reaction period between about ¼ hour and about 24 hours. With the use of an acid catalyst, it is preferred to employ a catalyst to reactant ratio between about 0.05 and about 1.0, a reaction temperature between about −10° C. and about 100° C., and a reaction period between about 2 hours and about 24 hours. When an activated clay is employed as the catalyst, it is preferred to use a catalyst to reactant ratio between about 0.05 and about 0.50, a reaction temperature between about 80° C. and about 200° C., and a reaction period between about 2 and about 16 hours. The metal halide catalysts, particularly aluminum chloride and boron trifluoride, in conjunction with a halogenated hydrocarbon solvent, as ethyl chloride, ethylene chloride, etc. are preferred where solids and highly viscous liquid copolymers are desired.

As indicated by the examples, varying ratios of terpene to isobutene may be employed. However, in the production of copolymers from predominantly terpene mixtures, it is preferred to employ between about 5% and about 50% by weight of isobutene on the basis of the terpene. On the other hand, where rubbery copolymers are desired which are characterized by their being sufficiently unsaturated to enable vulcanization, it is preferred to employ between about 1% and about 10% by weight of terpene on the basis of the isobutene.

In the preparation of the copolymer resins by the processes of the examples, a solvent for the reactants is desirably employed. As solvents, any organic liquid which is inert to the reactants and catalyst may be employed. Aliphatic hydrocarbons, such as, gasoline, petroleum naphtha, butane, pentane, etc.; aromatic hydrocarbons, such as, benzene, toluene, xylene, etc.; cyclic hydrocarbons, such as, cyclohexane, decahydronaphthalene, etc.; esters, such as, methyl acetate, ethyl acetate, propyl acetate, isopropyl acetate, n-butyl acetate, etc.; halogenated hydrocarbons, such as, chloroform, ethylene dichloride, carbon tetrachloride, trichloroethylene, ethyl chloride, methylene chloride, etc., may be employed.

Following the reaction period, the reaction mixture is treated to recover the copolymerization product. The examples are illustrative of certain methods of recovery. Others are applicable. Thus, where a metal halide or acid catalyst has been employed, it may be removed by washing the reaction mixture with water or an aqueous alkali or an aqueous inorganic acid. Following the aqueous alkali or acid wash, it is desirable to wash with water to remove all traces of alkali or acid. Furthermore, traces of dissolved catalyst and/or catalyst-copolymer complexes may be removed after water-washing by treatment with a suitable adsorbent, as Filter-Cel, bauxite, activated alumina, activated magnesium silicate, fuller's earth, activated carbon, etc. Finally, the solvent, if one has been used, and any unreacted constituents will be removed, desirably, by vacuum distillation using a final bath temperature of 170 to 220° C.

The color of the final products may be improved by utilizing terpenes which have been distilled from caustic. Also, the use of an inert atmosphere, such as, $CO_2$, $N_2$, etc., during the reaction yields pale-colored products. Other refining agents which may be employed include the adsorbents hereinbefore mentioned, also selective solvents, such as, furfural, furfuryl alcohol, phenol, etc. If desired, the copolymer resins obtained in accordance with the processes described herein may be subjected to vacuum distillation to remove volatile copolymers, leaving copolymer residues having higher melting points than the initial copolymerization product.

The copolymers resulting from the copolymerization of terpene-isobutene mixtures which are predominantly terpene are characteristically soft resins, i. e., they have lower melting points than do the polymers formed upon polymerization of the terpene itself. Quite unexpectedly, however, it has been found that these resinous copolymers although they have lower melting points exhibit increased viscosities as compared with the corresponding terpene polymers. The copolymer resins themselves show their increased viscosity, also their solutions in inert solvents. Furthermore, copolymers prepared from isobutene-terpene mixtures which are predominantly terpene possess an inherent flexibility which is lacking in terpene polymers. The brittleness of such terpene polymers makes them somewhat undesirable for use in protective coatings unless in combination with other resins contributing the desired flexibility. The copolymer resins are not subject to the disadvantage; they furthermore exhibit a tendency towards extensibility and retractability.

The copolymers which result from the copolymerization of terpene-isobutene mixtures which are predominantly isobutene are rubbery compositions which tend to be thermoplastic. These copolymers are distinctly interesting in that they are unsaturated and can be vulcanized. The rubbery polymers obtained from the polymerization of isobutene alone do not possess the advantage and hence their uses are limited. By employing minor proportions of a desired terpene in conjunction with isobutene, rubber-like materials result which can be easily vulcanized, hence overcoming one of the serious limitations in the use of the prior art polymers.

The solubility characteristics of the copolymer resins of this invention are such that they can be dissolved in common solvents, such as, benzene, toluene, gasoline, chlorinated hydrocarbons, etc. They are only slightly soluble in solvents, such as, ethyl alcohol, acetone, ethylene glycol, etc.

The copolymer resins prepared in accordance with the processes described herein, as a consequence of their good film-forming characteristics, are useful in the preparation of coatings for various surfaces, as wood, glass, paper and metal. Films of these resins are strong and flexible and adhere well to the aforesaid surfaces. The resins are also useful in the formulation of adhesives. In the form of pigmented compositions, they make excellent paints and lacquers for wood, metal, paper, etc. Unpigmented solutions or emulsions of the resins are suitable for impregnating paper, textiles, wood, etc., to contribute strength, toughness, flexibility, etc., thereto.

It will be understood that wherever in this specification reference is made to the melting point of a resinous material, a melting point as determined by the Hercules drop method is contemplated.

What I claim and desire to protect by Letters Patent is:

1. The process of preparing a solid copolymer of a terpene and isobutene which comprises treating a mixture of a terpene and isobutene with a catalyst capable of forming a solid copolymer of a terpene and isobutene at a temperature between about $-70°$ C. and about $200°$ C., said mixture containing at least 5% by weight of isobutene on the basis of the terpene.

2. The process of preparing a solid copolymer of a terpene and isobutene which comprises treating a mixture of a terpene and isobutene dissolved in an inert organic solvent with a catalyst capable of forming a solid copolymer of a terpene and isobutene at a temperature between about $-70°$ C. and about $200°$ C., said mixture containing at least 5% by weight of isobutene on the basis of the terpene.

3. The process of preparing a solid copolymer of a terpene and isobutene which comprises treating a mixture of a terpene and isobutene dissolved in an inert organic solvent with a metal halide catalyst capable of forming a solid copolymer of a terpene and isobutene at a temperature between about $-70°$ C. and about $-30°$ C., said mixture containing at least 5% by weight of isobutene on the basis of the terpene.

4. The process of preparing a solid copolymer of a terpene and isobutene which comprises treating a mixture of a terpene and isobutene dissolved in an inert organic solvent with an aluminum chloride catalyst at a temperature between about $-70°$ C. and about $-30°$ C., said mixture containing at least 5% by weight of isobutene on the basis of the terpene.

5. The process of preparing a solid copolymer of a monocyclic terpene and isobutene which comprises treating a mixture of a monocyclic terpene and isobutene dissolved in an inert organic solvent with an aluminum chloride catalyst at a temperature between about $-70°$ C. and about $-30°$ C., said mixture containing at least 5% by weight of isobutene on the basis of the terpene.

6. The process of preparing a solid copolymer of a terpene and isobutene which comprises treating a mixture of a terpene and isobutene dissolved in an inert organic solvent with an acid catalyst capable of forming a solid copolymer of a terpene and isobutene at a temperature between about $-10°$ C. and about $100°$ C., said mixture containing at least 5% by weight of isobutene on the basis of the terpene.

7. The process of preparing a solid copolymer of a terpene and isobutene which comprises treating a mixture of a terpene and isobutene dissolved in an inert organic solvent with an activated clay catalyst capable of forming a solid copolymer of a terpene and isobutene at a temperature between about $80°$ C. and about $200°$ C., said mixture containing at least 5% by weight of isobutene on the basis of the terpene.

8. The process of preparing a solid copolymer of beta-pinene and isobutene which comprises treating a mixture of beta-pinene and isobutene dissolved in ethyl chloride with an aluminum chloride catalyst at a temperature between about $-70°$ C. and about $-30°$ C., said mixture containing at least 5% by weight of isobutene on the basis of the beta-pinene.

9. A solid copolymer of a terpene and isobutene formed by a process which comprises treating a mixture of a terpene and isobutene with a catalyst capable of forming a solid copolymer of a terpene and isobutene at a temperature between about $-70°$ C. and about $200°$ C., said mixture containing at least 5% by weight of isobutene on the basis of the terpene.

10. A solid copolymer of a terpene and isobutene formed by a process which comprises treating a mixture of a terpene and isobutene dissolved in an inert organic solvent with a catalyst capable of forming a solid copolymer of a terpene and isobutene at a temperature between about −70° C. and about 200° C., said mixture containing at least 5% by weight of isobutene on the basis of the terpene.

11. A solid copolymer of an acyclic terpene and isobutene formed by a process which comprises treating a mixture of an acyclic terpene and isobutene dissolved in an inert organic solvent with a catalyst capable of forming a solid copolymer of an acyclic terpene and isobutene at a temperature between about −70° C. and about 200° C., said mixture containing at least 5% by weight of isobutene on the basis of the acyclic terpene.

12. A solid copolymer of allo-ocimene and isobutene formed by a process which comprises treating a mixture of allo-ocimene and isobutene dissolved in an inert organic solvent with a catalyst capable of forming a solid copolymer of allo-ocimene and isobutene at a temperature between about −70° C. and about 200° C., said mixture containing at least 5% by weight of isobutene on the basis of the allo-ocimene.

13. A solid copolymer of a monocyclic terpene and isobutene formed by a process which comprises treating a mixture of a monocyclic terpene and isobutene dissolved in an inert organic solvent with a catalyst capable of forming a solid copolymer of a monocyclic terpene and isobutene at a temperature between about −70° C. and about 200° C., said mixture containing at least 5% by weight of isobutene on the basis of the monocyclic terpene.

14. A solid copolymer of dipentene and isobutene formed by a process which comprises treating a mixture of dipentene and isobutene dissolved in an inert organic solvent with a catalyst capable of forming a solid copolymer of dipentene and isobutene at a temperature between about −70° C. and about 200° C., said mixture containing at least 5% by weight of isobutene on the basis of the dipentene.

15. A solid copolymer of a bicyclic terpene and isobutene formed by a process which comprises treating a mixture of a bicyclic terpene and isobutene dissolved in an inert organic solvent with a catalyst capable of forming a solid copolymer of a bicyclic terpene and isobutene at a temperature between about −70° C. and about 200° C., said mixture containing at least 5% by weight of isobutene on the basis of the bicyclic terpene.

16. A solid copolymer of a pinene and isobutene formed by a process which comprises treating a mixture of a pinene and isobutene dissolved in an inert organic solvent with a catalyst capable of forming a solid copolymer of a pinene and isobutene at a temperature between about −70° C. and about 200° C., said mixture containing at least 5% by weight of isobutene on the basis of the pinene.

17. The process of preparing a solid copolymer of a terpene and isobutene which comprises treating a mixture of a terpene and isobutene dissolved in an inert organic solvent with a catalyst capable of forming a solid copolymer of a terpene and isobutene at a temperature between about −70° C. and about 200° C., said mixture containing at least 5% by weight of isobutene on the basis of the terpene, and treating said solid copolymer with a refining agent.

EMIL OTT.